Oct. 21, 1969  J. J. GRUSSNER  3,473,421
COUNTERSINKING AND COUNTERBORING TOOL
Filed April 5, 1967  2 Sheets-Sheet 1

INVENTOR.
JOHN J. GRUSSNER
BY
Woodling Kroot Granger & Rust
Attys

United States Patent Office 3,473,421
Patented Oct. 21, 1969

3,473,421
COUNTERSINKING AND COUNTERBORING TOOL
John J. Grussner, Farmington, Mich., assignor to The
Weldon Tool Company, a corporation of Ohio
Filed Apr. 5, 1967, Ser. No. 628,730
Int. Cl. B23b 51/10; B23d 77/00
U.S. Cl. 77—73.5                                   6 Claims

ABSTRACT OF THE DISCLOSURE

A rotatable tool having a shank portion and a body portion which includes a cylindrical surface and a spirally generated beveled surface adjacent thereto. Wall means define a generally semi-circular surface in cross section, which intersects the cylindrical surface and the spirally generated beveled surface to define the cutting edges of the tool. The wall means at the opposed ends of the semi-circular surface continue as generally parallel side walls of a slot which opens onto the outer surface of the tool. The side walls and semi-circular surface extend in a direction which defines an acute angle with respect to the axis of the tool.

---

The invention relates generally to the art of tools constructed in the manner illustrated in U.S. Patents 2,829,543 and 2,829,544.

The present construction provides an improvement over these prior constructions in that a more ready escape route for chips is provided and the tool is more readily and economically mass produced.

Other objects and a fuller understanding of this invention may be had by referring to the following description and claims, taken on conjunction with the accompanying drawings, in which:

Figure 1:
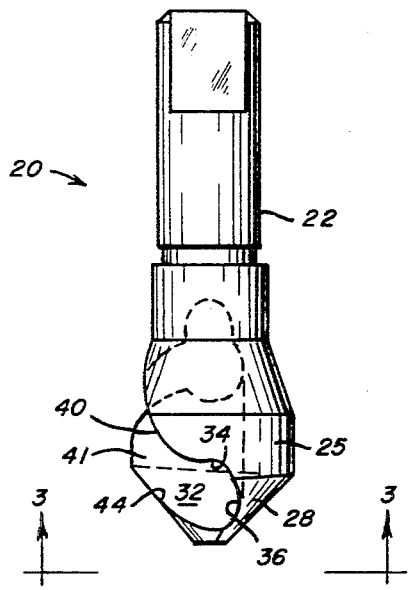
FIGURE 1 is an elevational view of the tool of the present invention.

The tool of the present invention is indicated generally by the reference numeral 20 and is capable of performing countersinking, counterboring and deburring operations on a workpiece. The tool has a shank 22 which is capable of being held in the chuck of a power driven device (not shown) so as to rotatively drive the same.

The body of the tool comprises a counterboring portion 25 having a cylindrical surface and a countersinking portion 28 which has a surface which initially appears to be generally conical in shape. This surface is described as being beveled in the sense that it makes an acute angle with the axis 30 of the tool and is said to be spirally generated for a reason which will be discussed in greater detail hereinafter.

Figure 4:
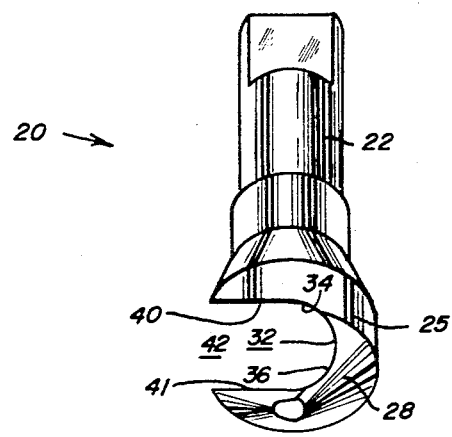
FIGURE 4 is a view taken generally along the line 4—4 of FIGURE 2.
Figure 5:
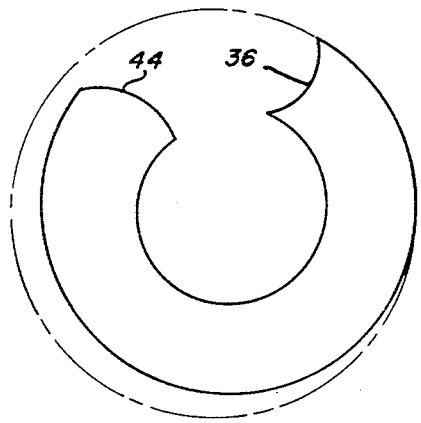
FIGURE 5 is a diagrammatic illustration of a development of the spirally generated beveled surface referred to in this specification.

Wall means 32 are provided in the body of the tool which intersect the cylindrical surface 25 and the beveled surface 28 and in cross section (see FIGURE 4) presents the shape of a semi-circle. This shape may not be precisely a semi-circular shape, but should give generally a concave curve type appearance or it might be described as generally U-shaped. It will be appreciated that it would be possible to extend this surface more or less than 180 degrees without departing from the teachings of the present invention. The intersection of wall means 32 with the cylindrical surface 25 defines a counterboring cutting edge 34 and the intersection with surface 28 defines a countersinking cutting surface 36. The wall means 32 extend from the ends of the semi-circle as two generally parallel side walls 40 and 41 respectively and these side walls define generally a slot 42 which opens onto the outside surface of the tool. The general extent of this slot or the axis thereof defines an acute angle with the axis 30. As seen the slot opens through the surface 28, the surface 25 and the shank 22.

As mentioned hereinabove, the surface 28 is said to be spirally generated in that the cutting edge 36 occupies a greater or more outwardly radial position with respect to the axis 30 than corresponding positions circumferentially removed on the surface 28. This has been indicated diagrammatically in FIGURE 4 wherein cutting edge 36 is shown as leading the trailing edge 44. This provides rotational clearance for the cutting edge 36. The spirally generated beveled surface or its equivalent may be produced in several ways such as above which may be compared with the spiral of a screw thread or helix or the spiral may be generated in a radial direction with no axial lead in the nature of a clock spring spiral. This surface may be produced by a combination of the above referred to spirals or suitable reliefs may be provided in the surface in a manner which would normally not be considered smooth and regular but which provide relief behind or ahead of the cutting edge, as the case may be, so as to permit cutting action by edge 36.

Figure 2:
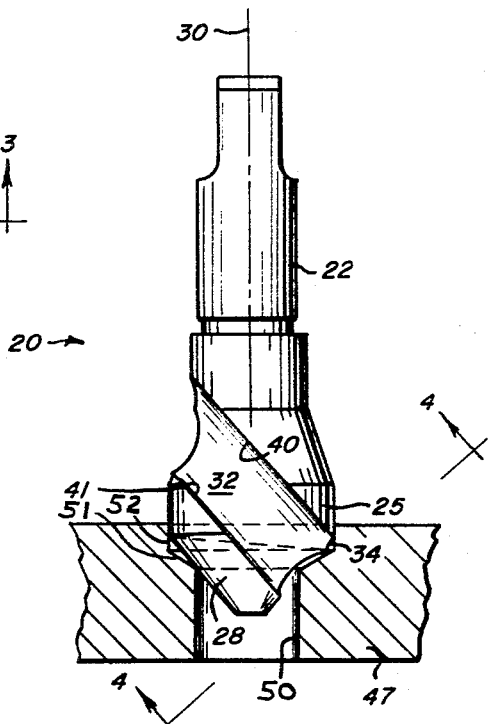
FIGURE 2 is a view taken from the left side of FIGURE 1.
Figure 3:
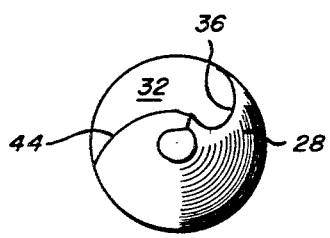
FIGURE 3 is a view taken generally along the line 3—3 of FIGURE 1.

FIGURE 2 demonstrates the use of the tool 20 on a workpiece 47 which has a hole 50 extending therethrough. The tool 20 produces a countersunk portion 51 and a counterbored portion 52 by rotation and axial movement of the tool. At the same time the cutting edges of the tool will perform a deburring operation removing burrs from the corners and edges of the hole 50. As the tool is rotated the chips which are removed by edges 34 and 36 tend to generally follow the extent of slot 42, however, they are free to move transverse to this direction through the open side of the slot 42.

It will therefore be apparent that the present construction offers substantial advantages over those designs wherein the chip escape route is annularly surrounded and in some applications tend to become obstructed with chips, thus inhibiting the free flow thereof. The present design also offers substantial advantages in its production in that the slot and semi-circular wall can be produced by fixturing a plurality of tool blanks in appropriate position and then passing a milling cutter of appropriate contour, progressively across the fixtured blanks producing the slot and cutting edges. This is advantageous over the drilling of the holes in the prior art structures referred to above. It will also be appreciated by those skilled in the art that although the slot 42 is provided with generally parallel side walls 40 and 41, these side walls might not be parallel and might tend to converge toward each other or they might diverge away from each other without departing from the spirit and teachings of this invention. The side walls may also be essentially non-existent in that only the U-shape may remain and the ends of the U-shape simply open onto the outer surface of the tool. This design can be used with the type of tool shown or the tool might have a pilot or other variations.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A combined countersinking and counterboring tool comprising a body having countersinking and counterboring portions, said countersinking portion including a spirally generated beveled surface, said counterboring portion including an annular surface, wall means defining a generally concave surface in cross section extending through said tool at an acute angle to the axis thereof and intersecting both said spirally generated beveled surface and said annular surface, the intersection of said concave surface with said spirally generated beveled surfaces forming a countersinking cutting edge, the intersection of said concave surface with said annular surface forming a counterboring cutting edge, said countersinking and counterboring cutting edges extending at substantially a right angle to the extent of said generally concave surface defined by said wall means, said wall means extending from generally the ends of said concave surface as first and second opposed walls which extend to and open onto the outside surface of said body.

2. A tool as claimed in claim 1 wherein said annular surface is cylindrical in shape.

3. A tool as claimed in claim 1 wherein said concave surface is semi-circular in shape.

4. A tool as claimed in claim 1 wherein said first and second opposed walls are generally parallel to each other.

5. A tool as claimed in claim 4 wherein said annular circular in shape.

6. A combined countersinking and counterboring tool comprising a body having countersinking and counterboring portions, said countersinking portion including a spirally generated beveled surface, said counterboring portion including an annular surface, wall means defining a concave surface in cross section extending through said tool at an acute angle to the axis thereof and intersecting both said spirally generated beveled surface and said annular surface, the intersection of said concave surface with said spirally generated beveled surfaces forming a countersinking cutting edge, the intersection of said concave surface with said annular surface forming a counterboring cutting edge, said countersinking and counterboring cutting edges extending at substantially a right angle to the extent of said generally concave surface defined by said wall means, said wall means opening onto the outside surface of said body.

References Cited
UNITED STATES PATENTS

| | | | |
|---|---|---|---|
| 3,022,686 | 2/1962 | Rowley | 77—73.5 |
| 2,829,543 | 4/1958 | Bergstrom | 77—73.5 |
| 2,442,554 | 6/1948 | Swiatek | 77—73.5 |

FRANCIS S. HUSAR, Primary Examiner

U.S. Cl. X.R.

145—123